(12) United States Patent
Salutes

(10) Patent No.: US 10,974,473 B2
(45) Date of Patent: Apr. 13, 2021

(54) METHOD AND APPARATUS FOR DISPENSING TEMPERATURE-ADJUSTED AUTOMOTIVE BODY SEALANT

(71) Applicant: IEC Fabrication, Fowlerville, MI (US)

(72) Inventor: Bradley Robert Salutes, Hamburg, MI (US)

(73) Assignee: IEC Fabrication, Fowlerville, MI (US)

( * ) Notice: Subject to any disclaimer, the term of this patent is extended or adjusted under 35 U.S.C. 154(b) by 42 days.

(21) Appl. No.: 16/447,697

(22) Filed: Jun. 20, 2019

(65) Prior Publication Data
US 2020/0398508 A1 Dec. 24, 2020

(51) Int. Cl.
| | | |
|---|---|---|
| *B29C 73/16* | (2006.01) | |
| *B29C 73/30* | (2006.01) | |
| *B05C 11/10* | (2006.01) | |
| *B60R 13/08* | (2006.01) | |

(52) U.S. Cl.
CPC ........ *B29C 73/166* (2013.01); *B05C 11/1047* (2013.01); *B29C 73/30* (2013.01); *B60R 13/08* (2013.01); *B29C 2791/007* (2013.01)

(58) Field of Classification Search
CPC . B29C 73/166; B29C 73/30; B29C 2791/007; B29C 73/34; B60R 13/08; B05C 5/001; B05C 5/02; B05C 11/1047; B05D 5/00
See application file for complete search history.

(56) References Cited

U.S. PATENT DOCUMENTS

2005/0230423 A1* 10/2005 Riney ................ B05C 5/001
222/146.2

* cited by examiner

*Primary Examiner* — Jason K Niesz
(74) *Attorney, Agent, or Firm* — Dinsmore & Shohl LLP

(57) ABSTRACT

A method for dispensing temperature-automotive body sealant includes providing a dispensing system having a pump operable to pump the sealant and a manifold receiving the sealant and operable to temperature-adjust the sealant has an elongated central body and elongated passages extending from the first end to the second end. First and second end caps are detachably connected to ends of the central body. A thermal unit is in thermal communication with the elongated central body and operable to heat or cool the elongated central body. A dispenser is in fluid communication with the manifold and operable to dispense the temperature-adjusted sealant. Sealant is pumped through the manifold and heated or cooled so as to provide a temperature-adjusted sealant. The temperature-adjusted sealant is dispensed from the dispenser.

22 Claims, 7 Drawing Sheets

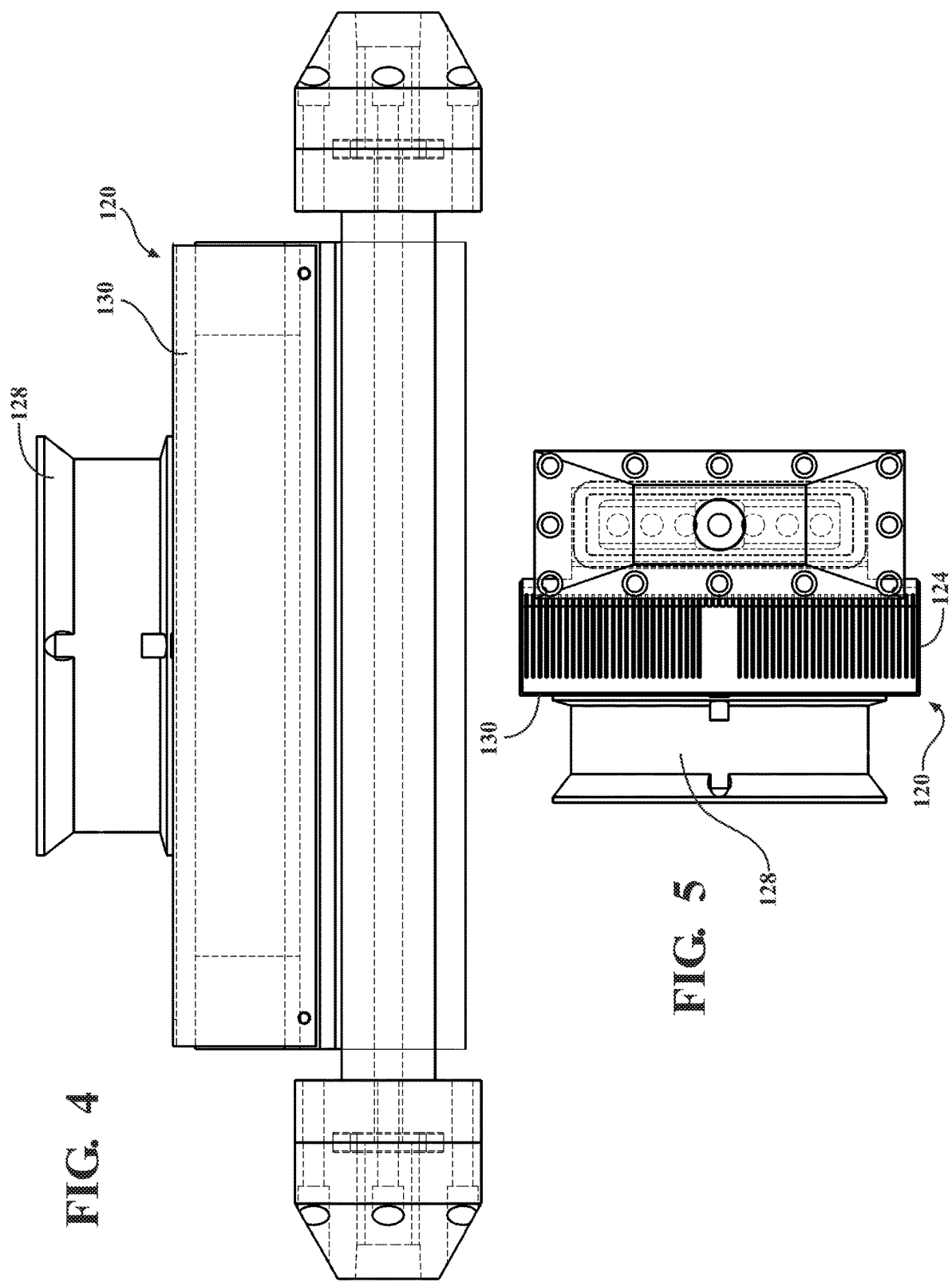

US 10,974,473 B2

METHOD AND APPARATUS FOR DISPENSING TEMPERATURE-ADJUSTED AUTOMOTIVE BODY SEALANT

FIELD OF THE INVENTION

The present relates generally to methods and apparatus for the dispensing of temperature-adjusted automotive body sealants.

BACKGROUND OF THE INVENTION

Automotive body sealants are widely used in the manufacturing of automobiles, where they are sprayed or otherwise dispensed onto vehicle bodies and/or components. Examples of such automotive body sealants include underbody coating (UBC), seam sealer, PVC sealer, anti-chip coating, acoustic damping or absorbent materials and a variety of other materials. Some such automotive body sealants are designed to be dispensed at particular temperatures and therefore dispensing systems include heating and/or cooling devices for adjusting the temperature of the sealant.

FIG. 1 illustrates a generic system 10 for dispensing automotive body sealants. The sealants are provided with some type of supply 12, such as a barrel or tank. The supply is connected to an intake 14 to provide the sealant to a pump 16. The pump pumps the sealant through a conduit 18 to a heating or cooling system 20 where the sealant is heated or cooled. Exemplary systems include a manifold, with a plurality of passages for the sealant, in thermal communication with a plurality of passages for heated or cooled water. The water is heated or cooled by a thermal control system, not shown. The pump 16 forces the sealant through the system 20 where it is temperature-adjusted. The sealant then flows out through some type of dispenser 22. Such dispensers may take a variety of forms. The sealant is typically highly viscous and therefore a significant amount of energy and pressure is required to force the sealant through the manifold and out of the dispenser. Additional pumps may be provided. Also, the supply may be pressurized such that it is forced out of the supply rather than being pumped out.

FIG. 2 illustrates an exemplary manifold 50, which may be used as part of the heater or cooler 20 the system of FIG. 1. The manifold 50 is manufactured from a block 52 of materials such as aluminum. In one example, the block 52 is rectangular and has a first end 54 and a second end 56. In order to provide sealant passages in the manifold, a plurality of parallel longitudinal channels 58 are drilled from the first end 54 to the second end 56. A first cross-channel 60 is drilled perpendicularly to the longitudinal channels 58 near the first end 54 so as to intersect each of the channels 58. A second cross-channel 62 is drilled perpendicular to the longitudinal channels 58 near the second end 56 so as to also intersect each of the channels 58. This leaves a plurality of ports 64 in the first end 54 of the block 52 and a plurality of ports 66 in the second end 56 of the block 52, along with a pair of ports 68 and 70 at the end of the cross channel 60 and a pair of ports 72 and 74 at the ends of the cross channel 62. All but one of the ports 64 is then plugged with a plug 75 and all but one of the ports 66 is plugged with a plug 76. Each of the cross-channel ports 68, 70, 72, 74 are plugged with plugs 80. This results in a manifold having one inlet defined by the unplugged port 64 in the first end and an outlet defined by the unplugged port 66 in the second end with the parallel longitudinal channels 58 being in fluid communication with one another via the cross-channels 60, 62. As shown, the non-plugged port 64 may be a first one of the parallel longitudinal channels 58 and the unplugged port 66 may be the last of the parallel longitudinal channels 58 such that material flowing through the manifold 50 is forced to go through the cross-channels 60 and 62.

The manifold of FIG. 2 has a number of drawbacks. First, the various plugged ports create short dead-end passages in which material may accumulate and dry out. Over time, this dried out material may start to block the flow passages, a process referred to as packing out. At this point, the manifold 50 is removed from production, each of the plugs 75, 76, 80 is removed, and the various channels are reamed out so as to remove the dried material. The manifold 50 also provides a significant amount of flow resistance, increasing the energy and pressure required to pump the highly viscous automotive body sealant through the manifold. Referring to FIG. 2, the manifold 50 would typically have some type of heating or cooling device attached to the side faces. For example, hot or cold water manifolds may be attached thereto.

SUMMARY OF THE INVENTION

The present invention provides methods and apparatus for dispensing temperature-adjusted automotive body sealant. An embodiment of a method for dispensing temperature-automotive body sealant includes providing a dispensing system having a pump operable to pump the sealant and a manifold receiving the sealant and operable to temperature-adjust the sealant as the sealant is pumped through the manifold. The manifold includes an elongated central body having a first end and a second end with a longitudinal axis defined therebetween and a plurality of elongated passages defined generally longitudinally through the elongated central body, each of the elongated passages extending from the first end to the second end of the elongated central body. A first end cap is detachably connected to the first end of the elongated central body, the first end cap having an inlet opening for receiving sealant, the first end cap further defining an inlet chamber in fluid communication with the inlet opening, the inlet chamber sized and configured so as to be in fluid communication with all of the plurality of elongated passages. A second end cap is detachably connected to the second end of the elongated central body, the second end cap having an outlet opening for sealant to flow from the manifold, the second end cap further defining an outlet chamber in fluid communication with the outlet opening, the outlet chamber sized and configured so as to be in fluid communication with all of the plurality of elongated passages. At least one thermal unit is in thermal communication with the elongated central body and operable to heat or cool the elongated central body. A dispenser is in fluid communication with the manifold and operable to dispense the temperature-adjusted sealant. The method further includes pumping sealant through the manifold, heating or cooling the sealant in the manifold so as to provide a temperature-adjusted sealant, and dispensing the temperature-adjusted sealant from the dispenser.

Embodiments of the method may further include cleaning the manifold, including the steps of: detaching the first and second end caps from the elongated central body to expose the first and second ends of the plurality of elongated passages; cleaning the plurality of elongated passages and the caps of sealant; and reattaching the first and second end caps to the elongated central body.

In some versions, the at least one thermal unit comprises at least one thermoelectric unit, each thermoelectric unit being disposed adjacent a side of the elongated central body, each thermoelectric unit being operable to heat the elongated central body in a heating mode and cool the elongated central body in a cooling mode.

The plurality of elongated passages may each has a constant round cross section. The chamber of each end cap may be flared outwardly from the respective opening to a mating face of the end cap, the mating face being received against the respective end of the elongated central body.

The elongated central body may include a first and a second elongated body, the first end of the second elongated body being connected to the second end of the first elongated body and the second cap being connected to the second end of the second elongated body.

In some versions, the automotive body sealant is under-body coating (UBC), seam sealer, PVC sealer, anti-chip coating, or acoustic damping or absorbent material.

The manifold may further include at least one temperature sensor in communication with a temperature control unit operable to control a temperature of the sealant flowing through the elongated central body, and the method may further include controlling the temperature of the sealant.

The manifold may further include turbulators removably disposed in the elongated passages.

Further aspects of the present invention may include embodiments of a dispensing system for automotive body sealant. The system includes a pump operable to pump the sealant and a manifold receiving the sealant and operable to temperature-adjust the sealant as the sealant is pumped through the manifold. The manifold includes an elongated central body having a first end and a second end with a longitudinal axis defined therebetween, a plurality of elongated passages defined generally longitudinally through the elongated central body, each of the elongated passages extending from the first end to the second end of the elongated central body; a first end cap detachably connected to the first end of the elongated central body, the first end cap having an inlet opening for receiving sealant, the first end cap further defining an inlet chamber in fluid communication with the inlet opening, the inlet chamber sized and configured so as to be in fluid communication with all of the plurality of elongated passages; and a second end cap detachably connected to the second end of the elongated central body, the second end cap having an outlet opening for sealant to flow from the manifold, the second end cap further defining an outlet chamber in fluid communication with the outlet opening, the outlet chamber sized and configured so as to be in fluid communication with all of the plurality of elongated passages. At least one thermal unit is in thermal communication with the elongated central body and operable to heat or cool the elongated central body. A dispenser is in fluid communication with the manifold and operable to dispense the temperature-adjusted sealant;

The at least one thermal unit may be a pair of thermoelectric units, each thermoelectric unit being disposed adjacent a side of the elongated central body, each thermoelectric unit being operable to heat the elongated central body in a heating mode and cool the elongated central body in a cooling mode.

The plurality of elongated passages may each have a constant round cross section.

In some versions the chamber of each end cap is flared outwardly from the respective opening to a mating face of the end cap, the mating face being received against the respective end of the elongated central body.

The elongated central body may include a first and a second elongated body, the first end of the second elongated body being connected to the second end of the first elongated body and the second cap being connected to the second end of the second elongated body.

The manifold may further include at least one temperature sensor in communication with a temperature control unit operable to control a temperature of the sealant flowing through the elongated central body. The manifold may include turbulators removably disposed in the elongated passages.

BRIEF DESCRIPTION OF THE DRAWINGS

FIG. 4 is a top view of an embodiment of a manifold in accordance with the present invention;

FIG. 5 is an end view of the manifold of FIG. 4;

DETAILED DESCRIPTION OF THE INVENTION

Figure 1:
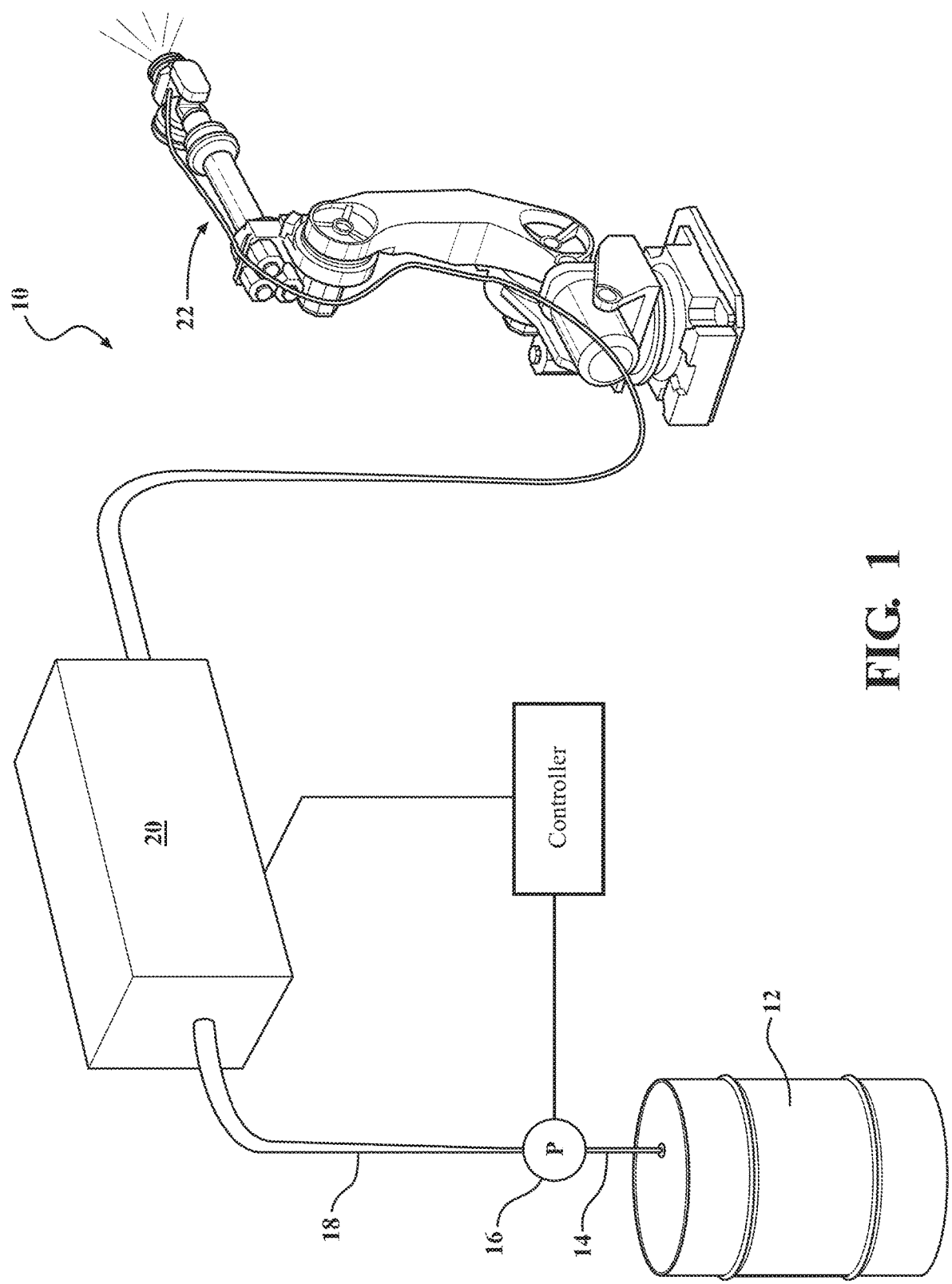
FIG. 1 is a schematic representation of a system for dispensing automotive body sealant.
Figure 2:
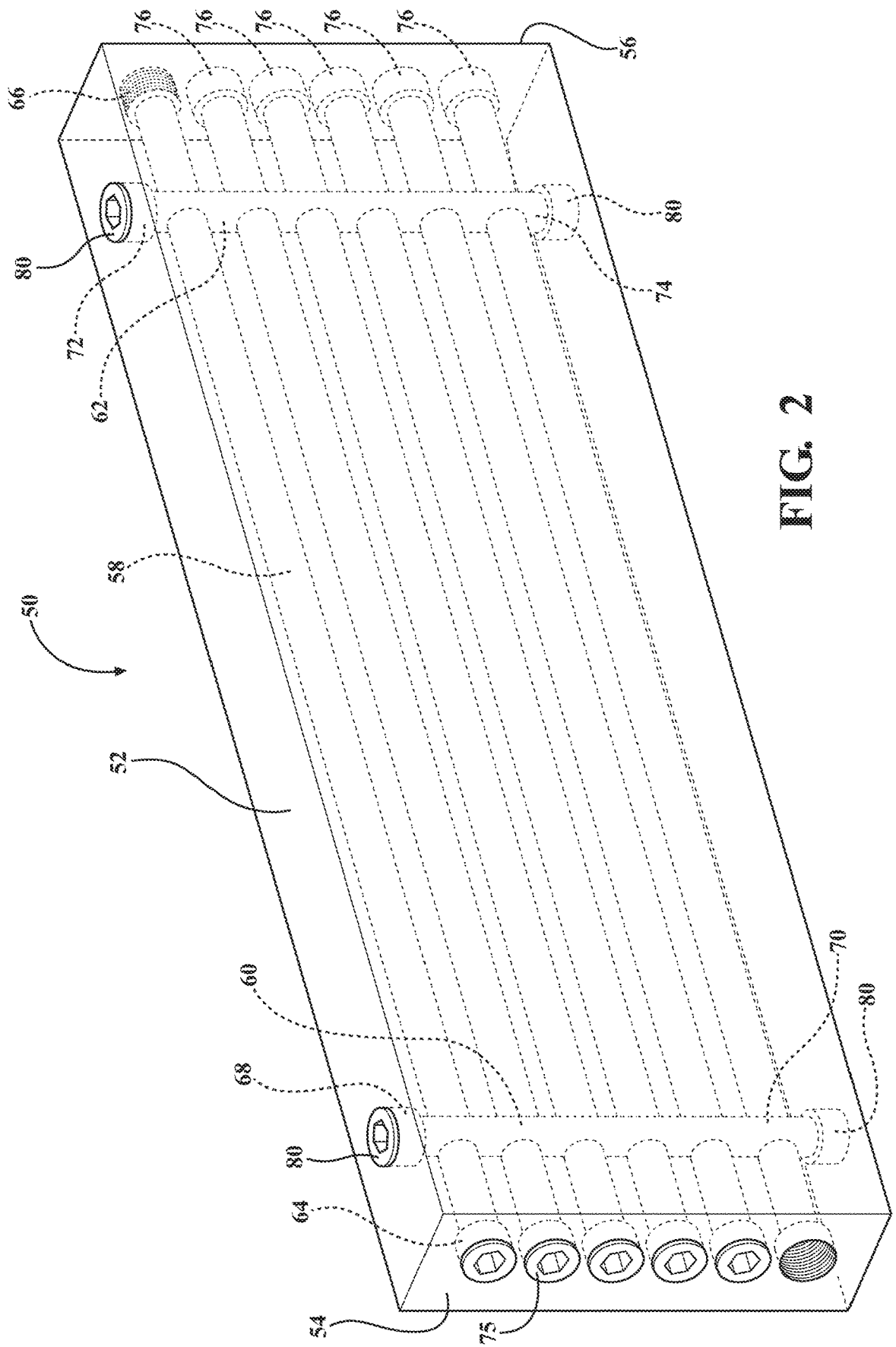
FIG. 2 is a drawing of a prior art manifold for use with certain dispensing systems.

The present invention provides methods and apparatus for dispensing temperature-adjusted automotive body sealant. Such a system 10 may be schematically represented as shown in FIG. 1. A supply of automotive body sealant is provided at 12 and may take the form of a barrel, a tank, or any other appropriate storage for automotive body sealant. The term "automotive body sealant" as used herein is intended to include all types of materials that are applied to the body or components of an automotive vehicle during manufacture and assembly. Specifically, the types of automotive body sealants used with embodiments of the present invention are those that require heating or cooling for proper application. While the term "automotive" is used, this term is used herein to mean any type of vehicle or manufactured product to which sealants of the type discussed herein are applied. The term "sealant" is intended to include all types of sealers, adhesives, coatings and other materials that require heating or cooling for proper application. Non-limiting examples of such automotive body sealants include under-body coating (UBC), seam sealer, PVC sealer, anti-chip coating, and acoustic damping and absorbent materials. Other non-limiting examples include various coatings and adhesives.

As known to those of skill in the art, manufacturing facilities themselves may not be temperature-controlled and therefore the ambient temperature in such a facility may be a normal "room temperature" or may be higher or lower, depending on the season and conditions. Certain automotive body sealants are designed to be dispensed at particular temperatures or temperature ranges so as to perform as desired. As such, the automotive body sealants may require heating or cooling so as to be dispensed at an appropriate temperature. Referring again to FIG. 1, the automotive body sealant is pumped from the supply 12 through an intake 14 to a pump 16. In some embodiments, the pump may draw directly from the supply, be at the bottom of the supply or below the supply for gravity assist, and the intake may take the form of a conduit or an opening to the pump. In further embodiments, the pump may take the form of a pressurization system for the supply such that the material is pushed out of the supply to an additional pump or to the remainder of the system. Additional pumps may be provided. In FIG. 1, the pump 16 is connected to a conduit 18 which is in fluid communication with the manifold 20. In accordance with some embodiments of the present invention, the manifold may be of the form described in detail hereinbelow. The manifold, in turn, is in fluid communication with some type of dispensing apparatus 22. The dispensing apparatus may take a variety of forms including sprayers of various types.

In certain embodiments of the present invention, the manifold takes the form of an elongated central body with removable end caps that allow for easy and efficient cleaning of the passages in the manifold. The manifold further includes at least one thermal unit for heating or cooling the elongated body such that sealant pumped through the manifold is heated or cooled to a desired temperature.

Figure 3:
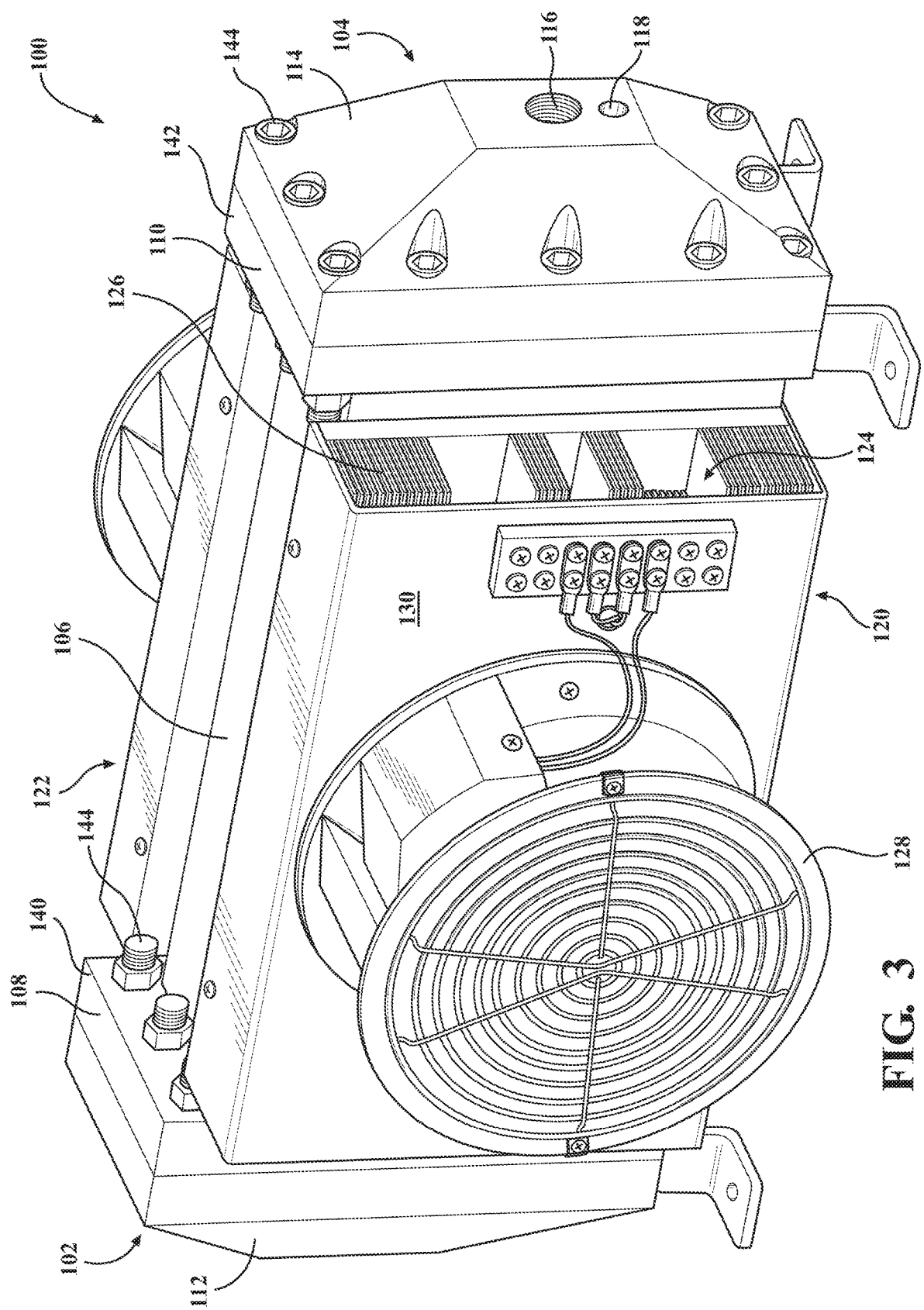
FIG. 3 is a perspective view of an embodiment of a manifold in accordance with the present invention.

Referring to FIG. 3, a first embodiment of the manifold 100 in accordance with the present invention will be described in more detail. The manifold 100 has inlet end 102 to which automotive body sealant is supplied and an outlet end 104 from which temperature-adjusted automotive body sealant flows to a dispenser. The manifold includes an elongated central body 106 having a first end 108 and an opposed second end 110. The elongated central body may be said to have a longitudinal axis defined as extending from the first end 108 to the second end 110. A first end cap 112 is detachably connected to the first end 108 of the elongated central body 106. The first end cap 112 has an inlet opening, not shown, for receiving sealant. A second end cap 114 is detachably connected to the second end 110 of the elongated central body 106. The second end cap has an outlet opening 116 for temperature-adjusted sealant to flow from the manifold. In some embodiments, the first end cap 112 and second end cap 114 are substantially identical. In FIG. 3, the second end cap 114 has a temperature sensor opening 118 which the first end cap may lack. However, for purposes of this disclosure, the two end caps are considered to be substantially identical in that the only difference is the provision of one or more small openings for sensors in one or both caps.

Figure 6:
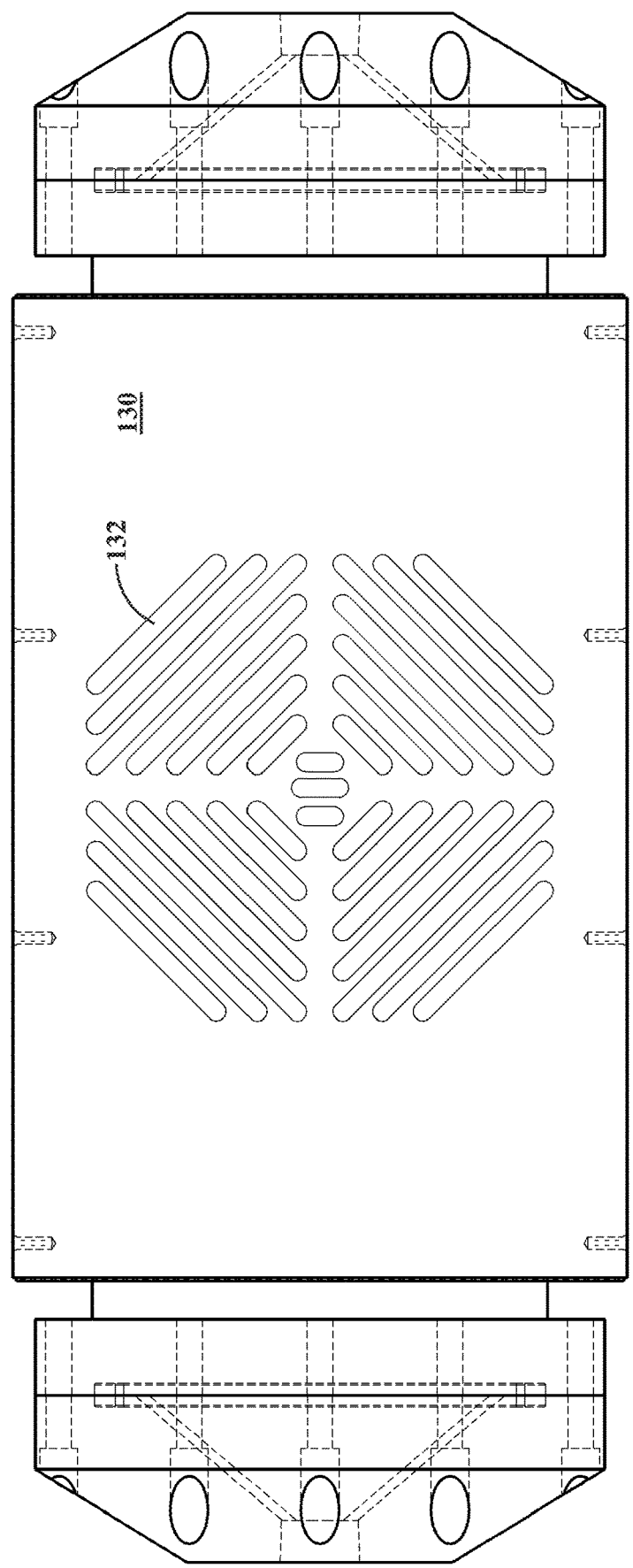
FIG. 6 is a side view of the manifold of FIGS. 4 and 5 with the fan removed.

The manifold 100 further includes at least one thermal unit 120 in thermal communication with the elongated central body 106, operable to heat or cool the elongated central body. In the illustrated embodiment, two substantially identical thermal units 120 and 122 are attached to opposing side faces of the elongated central body 106. FIG. 4 shows a top view of a similar manifold having only a single thermal unit on one face of the elongated central body. FIG. 5 shows an end view of the manifold in FIG. 4. FIGS. 3-5 will be used to explain the structure and function of the illustrated embodiment of thermal unit 120. In accordance with some embodiments of the present invention, the thermal unit 120 utilizes a thermoelectric module that is operable to heat or cool the elongated central body. As known to those of skill in the art, thermoelectric modules, when operating, use a Peltier effect to move heat from one side to the other, such that one side of the thermoelectric module is hot and the other side is cold. A thermoelectric module may have two modes, such that one side of the thermoelectric module may be heated or cooled with the opposite side therefore being cooled or heated, respectively. A thermoelectric module is represented as 124, forming part of a thermoelectric unit 120. The thermoelectric module typically has a plurality of heat transfer fins 126 so as to dissipate heat from or to warm the outer surface of the thermoelectric module. In the illustrated embodiment, the thermoelectric unit 120 further includes a fan 128 for drawing air over the fins 126. FIG. 6 shows a side view of the manifold with the fan removed. A cover 130 extends around the outer surfaces of the thermoelectric module 124 and has openings 132 aligned with the fan 128 such that the fan may draw air through the cover, thereby warming or cooling the outer surface of the thermoelectric module, thereby increasing its output. A control system may be provided for operating the fan as needed.

Figure 7:
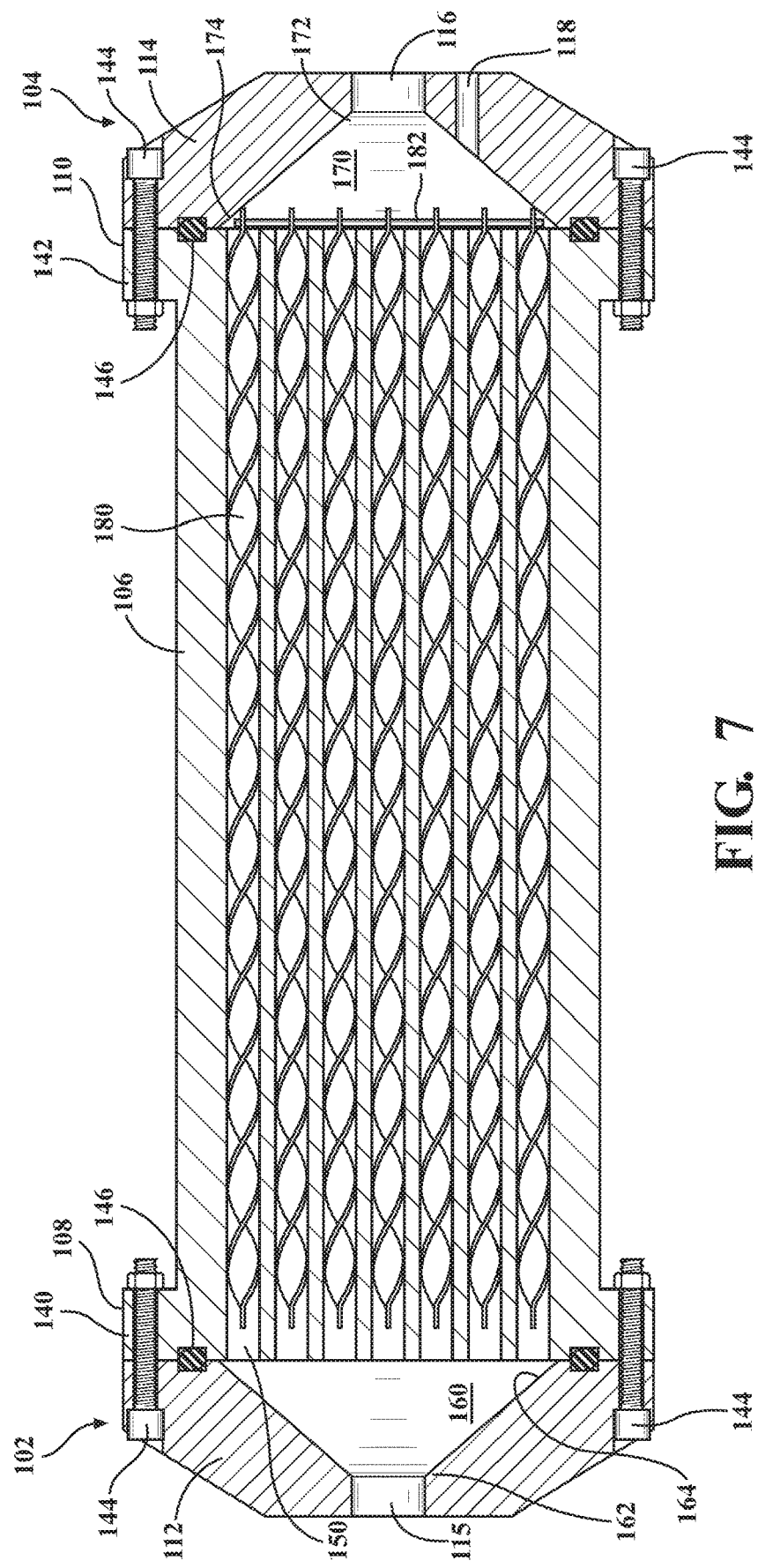
FIG. 7 is a cross-sectional view of a portion of a manifold in accordance with an embodiment of the present invention.

Referring now to FIG. 7, the elongated central body and end caps of the manifold will be discussed in more detail. FIG. 7 provides a longitudinal cross-sectional view of the elongated central body 106 and end caps 112, 114. In some embodiments, the elongated central body 106 is formed from a substantially solid block of aluminum, though it may be formed from two or more pieces that are joined together. In the illustrated embodiment, the first end 108 of the elongated central body 106 takes the form of a outwardly extended flange 140, and the second end 110 takes the form of a second outwardly flange 142. The end caps 112, 114 are detachably connected to the flanges 140 and 142, respectively, by a plurality of fasteners 144. The end caps are sealed to the ends of the elongated central body 106 such as by using seals 146. Very high pressures may be present inside the manifold so a very robust construction is desired.

Figure 8:
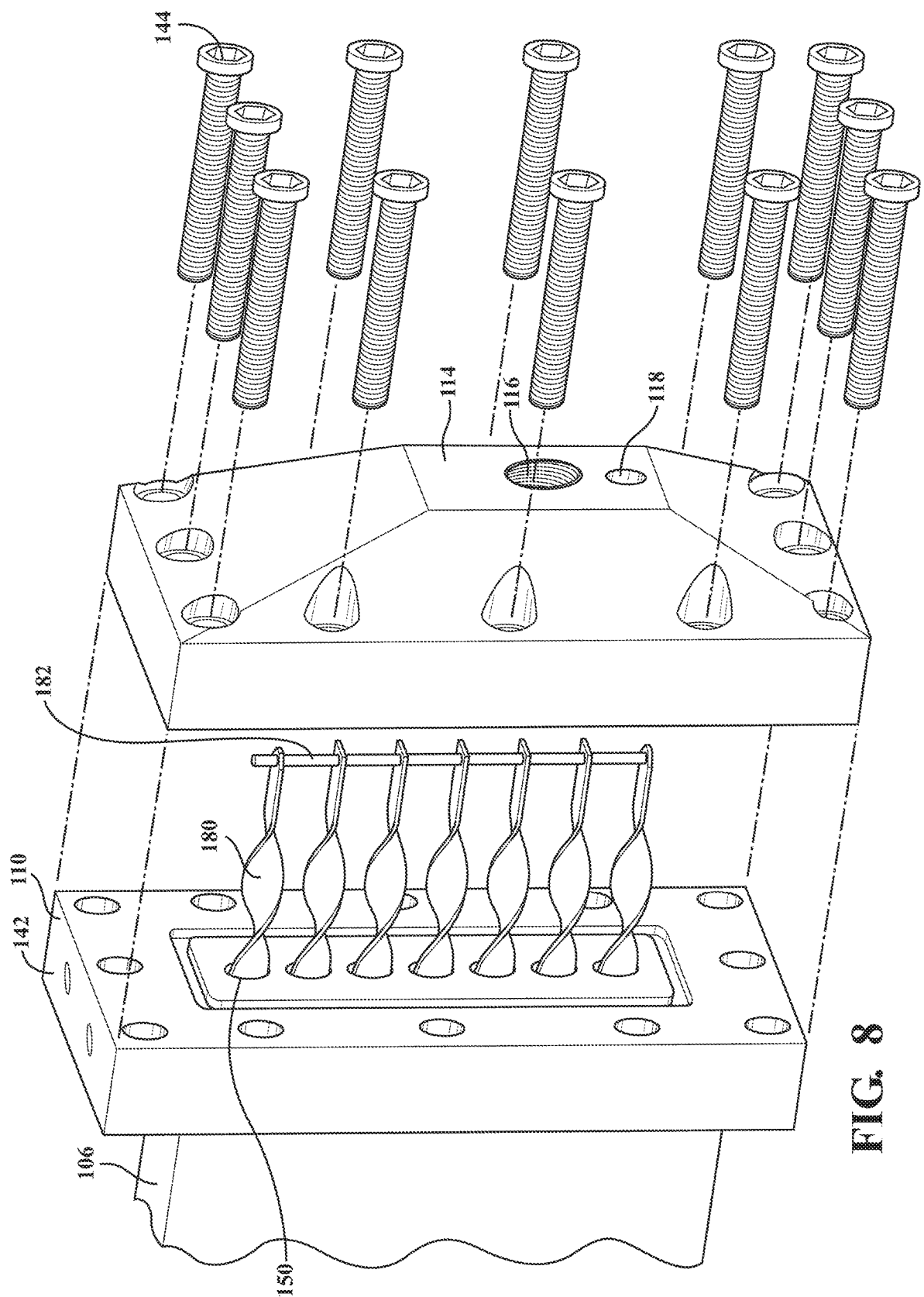
FIG. 8 is an exploded view of a portion of a manifold in accordance with an embodiment of the present invention.

The elongated central body 106 has a plurality of elongated passages 150 defined longitudinally from the first end 108 to the second end 110. In the illustrated embodiment, there are seven parallel and equally sized passages 150. FIG. 8 shows a portion of the elongated central body 106 and end cap 114 and, as shown, the passages 150 may each be circular in cross-section.

Referring again to FIG. 7, the inlet opening 115 in the first end cap 112 is shown. The first end cap further defines an inlet chamber 160 in fluid communication with the inlet opening 115. The inlet chamber is sized and configured so as to be in fluid communication with all of the plurality of elongated passages 150. In some embodiments, such as shown in FIG. 7, the inlet chamber 160 flares outwardly from the opening 115 from an inlet end 162 to a mating end 164, defining a mating face, with the flare being a constant and smooth increase in size. The mating end 164 has a top to bottom height equal to or greater than a distance between the upper end of the uppermost passage and the lower end of the lowermost passage.

FIG. 5 provides phantom lines indicating that the inlet chamber also flares side-to-side, such that the mating end is at least as wide as the front-to-back width of the plurality of passages. As such, the inlet chamber 160 provides for smooth flow from the inlet opening 115 to the inlet ends of each of the passages 150 and minimizes any non-flow areas so as to minimize packing out. Likewise, the second end cap 114 defines an outlet chamber 170 that also flares from the outlet opening 116 at the outlet end of the outlet chamber 170 to the mating end 174 with the mating end being large enough to encompass the outlet openings of all of the passages 150.

As shown in FIGS. 7 and 8, certain embodiments of the present may further include turbulators 180 disposed in each of the passages 150. Each turbulator is a twisted piece of metal extending along the length of the respective passage 150. The turbulators may be sized so as to completely or nearly span the width of each passage. The turbulator causes the sealant to have a turbulent flow through the passage thereby improving heat transfer between the elongated central body 106 and the sealant in the passages 150. The ends of the turbulators may be joined to one another by a crossbar connecting member 182. In some embodiments, the turbulators 180 and crossbar connecting member 182 form a turbulator assembly that is inserted from one end of the elongated central body 106 when the respective end cap, such as 114, is removed.

In an alternative embodiment, two or more elongated central bodies 106 may be joined end to end to provide a longer manifold, thereby allowing more heating or cooling.

Embodiments of the present invention provide a method for dispensing temperature-adjusted automotive body sealant, including the steps of providing the dispensing system with a supply for automotive body sealant and a pump operable to pump the sealant. As mentioned earlier, the pump may take the form of a pump that draws from the supply or that pressurizes the supply so as to force sealant out of the supply. A manifold, such as discussed above, is attached to the pump and is operable to temperature-adjust the sealant as the sealant is pumped through the manifold. A dispenser is in fluid communication with the manifold and operable to dispense the temperature-adjusted sealant. The method includes pumping sealant from the supply to the manifold, heating or cooling the sealant in the manifold to adjust the temperature of the sealant, and dispensing the temperature-adjusted sealant from the dispenser. In further embodiments, a cleaning method is provided which includes cleaning the manifold by detaching the first and second end caps from the elongated central body to expose the first and second ends of the plurality of elongated passages. In embodiments including a turbulator assembly, the turbulators 180 are then removed from the passages 150. With the end caps and turbulators removed, the passages may be easily cleaned by passing a rod or other cleaning device through each of the passages. The end caps may also be easily cleaned since all surfaces are exposed and no dead-end passages are present. After cleaning, the turbulators, if used, are reinserted into the passages and the first and second end caps are reattached.

Certain embodiments of the dispensing system may further include a temperature control system for the manifold. A temperature sensor may be inserted into the opening 118 in the outlet end of the manifold, with the temperature sensor connected to a temperature control system operable to control the thermal unit or units, thereby adjusting the temperature of the sealant until a desired temperature is reached.

The foregoing detailed description has been presented for purposes of illustration and description. It is not intended to be exhaustive or to limit embodiments to the precise form disclosed. Many modifications and variations are possible in light of the above teaching. The described embodiments were chosen in order to explain principles and practical applications, to thereby enable others skilled in the art to best utilize various embodiments and with various modifications as are suited to the particular use contemplated. It is intended that the scope be defined by the claims appended hereto.

The invention claimed is:

1. A method for dispensing temperature-adjusted automotive body sealant, comprising:
   providing a dispensing system, comprising;
      a pump operable to pump the sealant;
      a manifold receiving the sealant and operable to temperature-adjust the sealant as the sealant is pumped through the manifold, the manifold comprising;
      an elongated central body having a first end and a second end with a longitudinal axis defined therebetween, a plurality of elongated passages defined generally longitudinally through the elongated central body, each of the elongated passages extending from the first end to the second end of the elongated central body;
      a first end cap detachably connected to the first end of the elongated central body, the first end cap having an inlet opening for receiving sealant, the first end cap further defining an inlet chamber in fluid communication with the inlet opening, the inlet chamber sized and configured so as to be in fluid communication with all of the plurality of elongated passages;
      a second end cap detachably connected to the second end of the elongated central body, the second end cap having an outlet opening for sealant to flow from the manifold, the second end cap further defining an outlet chamber in fluid communication with the outlet opening, the outlet chamber sized and configured so as to be in fluid communication with all of the plurality of elongated passages;
      at least one thermal unit in thermal communication with the elongated central body and operable to heat or cool the elongated central body; and
      a dispenser in fluid communication with the manifold and operable to dispense the temperature-adjusted sealant;
   pumping sealant through the manifold;
   heating or cooling the sealant in the manifold so as to provide a temperature-adjusted sealant;
   dispensing the temperature-adjusted sealant from the dispenser; and
   cleaning the manifold, comprising the steps of;
      detaching the first and second end caps from the elongated central body to expose the first and second ends of the plurality of elongated passages;
      cleaning the plurality of elongated passages and the caps of sealant; and
      reattaching the first and second end caps to the elongated central body.

2. The method of claim 1, wherein the at least one thermal unit comprises at least one thermoelectric unit, each thermoelectric unit being disposed adjacent a side of the elongated central body, each thermoelectric unit being operable to heat the elongated central body in a heating mode and cool the elongated central body in a cooling mode.

3. The method of claim 1, wherein the plurality of elongated passages each has a constant round cross section.

4. The method of claim 1, wherein the chamber of each end cap is flared outwardly from the respective opening to a mating face of the end cap, the mating face being received against the respective end of the elongated central body.

5. The method of claim 1, wherein the automotive body sealant is under-body coating (UBC), seam sealer, PVC sealer, anti-chip coating, or acoustic damping or absorbent material.

6. The method of claim 1, wherein the manifold further comprises at least one temperature sensor in communication with a temperature control unit operable to control a temperature of the sealant flowing through the elongated central body, the method further comprises controlling the temperature of the sealant.

7. The method of claim 1, wherein the manifold further comprises turbulators removably disposed in the elongated passages.

8. A dispensing system for automotive body sealant, comprising:
    a pump operable to pump the sealant;
    a manifold receiving the sealant and operable to temperature-adjust the sealant as the sealant is pumped through the manifold, the manifold comprising;
    an elongated central body having a first end and a second end with a longitudinal axis defined therebetween, a plurality of elongated passages defined generally longitudinally through the elongated central body, each of the elongated passages extending from the first end to the second end of the elongated central body;
    a first end cap detachably connected to the first end of the elongated central body, the first end cap having an inlet opening for receiving sealant, the first end cap further defining an inlet chamber in fluid communication with the inlet opening, the inlet chamber sized and configured so as to be in fluid communication with all of the plurality of elongated passages;
    a second end cap detachably connected to the second end of the elongated central body, the second end cap having an outlet opening for sealant to flow from the manifold, the second end cap further defining an outlet chamber in fluid communication with the outlet opening, the outlet chamber sized and configured so as to be in fluid communication with all of the plurality of elongated passages;
    at least one thermoelectric unit disposed adjacent a side of the elongated central body so as to be in thermal communication with the elongated central body and operable to heat the elongated central body in a heating mode and cool the elongated central body in a cooling mode; and
    a dispenser in fluid communication with the manifold and operable to dispense the temperature-adjusted sealant.

9. The dispensing system of claim 8, wherein the at least one thermoelectric unit comprises a pair of thermoelectric units, each thermoelectric unit being disposed adjacent a side of the elongated central body, each thermoelectric unit being operable to heat the elongated central body in a heating mode and cool the elongated central body in a cooling mode.

10. The dispensing system of claim 8, wherein the plurality of elongated passages each has a constant round cross section.

11. The dispensing system of claim 8, wherein the chamber of each end cap is flared outwardly from the respective opening to a mating face of the end cap, the mating face being received against the respective end of the elongated central body.

12. The dispensing system of claim 8, wherein the manifold further comprises at least one temperature sensor in communication with a temperature control unit operable to control a temperature of the sealant flowing through the elongated central body.

13. The dispensing system of claim 8, wherein the manifold further comprises turbulators removably disposed in the elongated passages.

14. A method for dispensing temperature-adjusted automotive body sealant, comprising:
    providing a dispensing system, comprising;
    a pump operable to pump the sealant;
    a manifold receiving the sealant and operable to temperature-adjust the sealant as the sealant is pumped through the manifold, the manifold comprising;
    an elongated central body having a first end and a second end with a longitudinal axis defined therebetween, a plurality of elongated passages defined generally longitudinally through the elongated central body, each of the elongated passages extending from the first end to the second end of the elongated central body;
    a first end cap detachably connected to the first end of the elongated central body, the first end cap having an inlet opening for receiving sealant, the first end cap further defining an inlet chamber in fluid communication with the inlet opening, the inlet chamber sized and configured so as to be in fluid communication with all of the plurality of elongated passages;
    a second end cap detachably connected to the second end of the elongated central body, the second end cap having an outlet opening for sealant to flow from the manifold, the second end cap further defining an outlet chamber in fluid communication with the outlet opening, the outlet chamber sized and configured so as to be in fluid communication with all of the plurality of elongated passages;
    at least one thermoelectric unit disposed adjacent a side of the elongated central body so as to be in thermal communication with the elongated central body and operable to heat the elongated central body in a heating mode and cool the elongated central body in a cooling mode; and
    a dispenser in fluid communication with the manifold and operable to dispense the temperature-adjusted sealant;
    pumping sealant through the manifold;
    heating or cooling the sealant in the manifold so as to provide a temperature-adjusted sealant; and
    dispensing the temperature-adjusted sealant from the dispenser.

15. The method of claim 14, wherein the automotive body sealant is under-body coating (UBC), seam sealer, PVC sealer, anti-chip coating, or acoustic damping or absorbent material.

16. The method of claim 14, wherein the manifold further comprises at least one temperature sensor in communication with a temperature unit operable to control a temperature of the sealant flowing through the elongated central body, the method further comprises controlling the temperature of the sealant.

17. The method of claim 14, wherein the manifold further comprises turbulators removably disposed in the elongated passages.

18. A method for dispensing temperature-adjusted automotive body sealant, comprising:
    providing a dispensing system, comprising;
    a pump operable to pump the sealant;
    a manifold receiving the sealant and operable to temperature-adjust the sealant as the sealant is pumped through the manifold, the manifold comprising;
    an elongated central body having a first end and a second end with a longitudinal axis defined therebetween, a plurality of elongated passages defined generally longitudinally through the elongated central body, each of the elongated passages extending from the first end to the second end of the elongated central body;

a first end cap detachably connected to the first end of the elongated central body, the first end cap having an inlet opening for receiving sealant, the first end cap further defining an inlet chamber in fluid communication with the inlet opening, the inlet chamber sized and configured so as to be in fluid communication with all of the plurality of elongated passages;

a second end cap detachably connected to the second end of the elongated central body, the second end cap having an outlet opening for sealant to flow from the manifold, the second end cap further defining an outlet chamber in fluid communication with the outlet opening, the outlet chamber sized and configured so as to be in fluid communication with all of the plurality of elongated passages;

at least one thermal unit in thermal communication with the elongated central body and operable to heat or cool the elongated central body;

turbulators removably disposed in the elongated passages; and a dispenser in fluid communication with the manifold and operable to dispense the temperature-adjusted sealant;

pumping sealant through the manifold;

heating or cooling the sealant in the manifold so as to provide a temperature-adjusted sealant; and dispensing the temperature-adjusted sealant from the dispenser.

19. A dispensing system for automotive body sealant, comprising:

a pump operable to pump the sealant;

a manifold receiving the sealant and operable to temperature-adjust the sealant as the sealant is pumped through the manifold, the manifold comprising;

an elongated central body having a first end and a second end with a longitudinal axis defined therebetween, a plurality of elongated passages defined generally longitudinally through the elongated central body, each of the elongated passages extending from the first end to the second end of the elongated central body;

a first end cap detachably connected to the first end of the elongated central body, the first end cap having an inlet opening for receiving sealant, the first end cap further defining an inlet chamber in fluid communication with the inlet opening, the inlet chamber sized and configured so as to be in fluid communication with all of the plurality of elongated passages;

a second end cap detachably connected to the second end of the elongated central body, the second end cap having an outlet opening for sealant to flow from the manifold, the second end cap further defining an outlet chamber in fluid communication with the outlet opening, the outlet chamber sized and configured so as to be in fluid communication with all of the plurality of elongated passages;

turbulators removably disposed in the elongated passages;

at least one thermal unit in thermal communication with the elongated central body and operable to heat or cool the elongated central body; and a dispenser in fluid communication with the manifold and operable to dispense the temperature-adjusted sealant.

20. The dispensing system of claim 19, wherein the plurality of elongated passages each has a constant round cross section.

21. The dispensing system of claim 19, wherein the chamber of each end cap is flared outwardly from the respective opening to a mating face of the end cap, the mating face being received against the respective end of the elongated central body.

22. The dispensing system of claim 19, wherein the manifold further comprises at least one temperature sensors in communication with a temperature control unit operable to control a temperature of the sealant flowing through the elongated central body.

* * * * *